US011507429B2

(12) United States Patent
Lyuh et al.

(10) Patent No.: US 11,507,429 B2
(45) Date of Patent: Nov. 22, 2022

(54) NEURAL NETWORK ACCELERATOR INCLUDING BIDIRECTIONAL PROCESSING ELEMENT ARRAY

(71) Applicant: Electronics and Telecommunications Research Institute, Daejeon (KR)

(72) Inventors: Chun-Gi Lyuh, Daejeon (KR); Young-Su Kwon, Daejeon (KR); Chan Kim, Daejeon (KR); Hyun Mi Kim, Daejeon (KR); Jeongmin Yang, Busan (KR); Jaehoon Chung, Daejeon (KR); Yong Cheol Peter Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1156 days.

(21) Appl. No.: 16/038,243

(22) Filed: Jul. 18, 2018

(65) Prior Publication Data

US 2019/0079801 A1    Mar. 14, 2019

(30) Foreign Application Priority Data

Sep. 14, 2017  (KR) .................. 10-2017-0118068
Apr. 11, 2018  (KR) .................. 10-2018-0042395

(51) Int. Cl.
*G06N 3/063*    (2006.01)
*G06F 15/80*    (2006.01)
(Continued)

(52) U.S. Cl.
CPC ........ *G06F 9/5044* (2013.01); *G06F 9/30101* (2013.01); *G06F 9/3877* (2013.01);
(Continued)

(58) Field of Classification Search
CPC .......................... G06F 15/8046; G06N 3/063
See application file for complete search history.

(56) References Cited

U.S. PATENT DOCUMENTS 5,633,989 A    5/1997  Shin et al.
9,411,726 B2   8/2016  Ovsiannikov et al.
(Continued)

FOREIGN PATENT DOCUMENTS

EP           2224347 A1      9/2010
KR    10-2016-0038741 A      4/2016
WO     WO-2016/186801 A1    11/2016

OTHER PUBLICATIONS

Yufei Ma et al., " An Automatic RTL Compiler for High-Throughput FPGA Implementation of Diverse Deep Convolutional Neural Networks " School of Computing, Informatics, Decision Systems Engineering, Arizona State University, Tempe, USA, Downloaded on Aug. 25, 2022 from IEEE Xplore, Sep. 8, 2017.

*Primary Examiner* — Jacob Petranek
(74) *Attorney, Agent, or Firm* — Rabin & Berdo, P.C.

(57) ABSTRACT

Provided is a neural network accelerator which performs a calculation of a neural network provided with layers, the neural network accelerator including a kernel memory configured to store kernel data related to a filter, a feature map memory configured to store feature map data which are outputs of the layers, and a Processing Element (PE) array including PEs arranged along first and second directions, wherein each of the PEs performs a calculation using the feature map data transmitted in the first direction from the feature map memory and the kernel data transmitted in the second direction from the kernel memory, and transmits a calculation result to the feature map memory in a third direction opposite to the first direction.

7 Claims, 9 Drawing Sheets

(51) Int. Cl.
  *G06F 9/50*    (2006.01)
  *G06N 5/04*    (2006.01)
  *G06F 9/38*    (2018.01)
  *G06F 9/30*    (2018.01)

(52) U.S. Cl.
  CPC ......... *G06F 15/8046* (2013.01); *G06N 3/063* (2013.01); *G06N 5/04* (2013.01)

(56) References Cited

U.S. PATENT DOCUMENTS

| | | | |
|---|---|---|---|
| 9,805,303 B2* | 10/2017 | Ross | G06N 3/08 |
| 11,275,997 B1* | 3/2022 | Vantrease | G06N 3/0454 |
| 2016/0078863 A1 | 3/2016 | Chung et al. | |
| 2016/0358068 A1 | 12/2016 | Brothers et al. | |
| 2018/0129935 A1* | 5/2018 | Kim | G06N 3/082 |
| 2018/0260690 A1* | 9/2018 | Young | G06N 3/04 |
| 2018/0314671 A1* | 11/2018 | Zhang | G06N 3/063 |
| 2020/0117519 A1* | 4/2020 | Chen | G06F 9/223 |

\* cited by examiner

NEURAL NETWORK ACCELERATOR INCLUDING BIDIRECTIONAL PROCESSING ELEMENT ARRAY

CROSS-REFERENCE TO RELATED APPLICATIONS

This U.S. non-provisional patent application claims priority under 35 U.S.C. § 119 of Korean Patent Application Nos. 10-2017-0118068, filed on Sep. 14, 2017, and 10-2018-0042395, filed on Apr. 11, 2018, the entire contents of which are hereby incorporated by reference.

BACKGROUND

The present disclosure relates to a neural network accelerator, and more particularly, to a neural network accelerator including a bidirectional processing element array.

An Artificial Neural Network (ANN) may process data or information in a similar manner to a biological neural network. As a technology for image recognition, a convolutional neural network (CNN) is being actively researched which is one of deep neural network schemes. In particular, the CNN may provide an effective performance to various object recognitions such as an object, a character, a cursive script, an image, and the like.

The CNN configured using a plurality of layers may be implemented in a hardware form using a semiconductor device. When the CNN is implemented in a hardware form, hardware resources for implementing the CNN may be increasingly demanded due to an amount of calculations to be processed by each of the plurality of layers configuring the CNN. In addition, a frequency of memory accesses required to perform the calculations for the CNN may also increase. Therefore, a technology is necessary so as to reduce a limitation for implementing the CNN in a hardware form.

SUMMARY

The present disclosure provides a neural network accelerator including a bidirectional processing element array.

An embodiment of the inventive concept provides a neural network accelerator which performs a calculation of a neural network provided with layers, the neural network accelerator including: a kernel memory configured to store kernel data related to a filter; a feature map memory configured to store feature map data which are outputs of the layers; and a Processing Element (PE) array including PEs arranged along first and second directions, wherein each of the PEs performs a calculation using the feature map data transmitted in the first direction from the feature map memory and the kernel data transmitted in the second direction from the kernel memory, and transmits a calculation result to the feature map memory in a third direction opposite to the first direction.

In an embodiment of the inventive concept, a neural network accelerator which performs a calculation of a neural network provided with layers, the neural network accelerator including: a kernel memory configured to store kernel data related to a filter; a feature map memory configured to store feature map data which are outputs of the layers; and a Processing Element (PE) array including PEs arranged along first and second directions, and activation units arranged between the PEs and the feature map memory in the second direction, wherein each of the PEs performs a first calculation using the feature map data transmitted in the first direction from the feature map memory and the kernel data transmitted in the second direction from the kernel memory, and transmits a first calculation result to the activation units in a third direction that is opposite to the first direction, and the activation units perform second calculations on the first calculation result and transmit second calculation result to the feature map memory.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, an exemplary embodiment of the present disclosure will be described in detail with reference to the accompanying drawings such that a person skilled in the art may easily carry out the embodiments of the present disclosure.

The inventive concept relates to a neural network accelerator for performing calculations of a neural network. The neural network of the inventive concept may be an artificial neural network (ANN) capable of processing data or information in a similar manner to a biological neural network. The neural network may include a plurality of layers including artificial neurons that are similar to biological neurons. The neural network may be used in an artificial intelligence field in which an object is recognized and classified. Hereinafter, a convolutional neural network (CNN) for image recognition will be representatively described, but the neural network accelerator of the inventive concept is not limited to the CNN, and may be also used for implementing a neural network other than the CNN.

Typically, the convolution calculation may represent a calculation for detecting a correlation between two functions. In the CNN, a convolution calculation between a kernel for indicating input data or a specific feature and specific variables (for example, weights or biases, etc.) is repeatedly performed to determine a pattern of an image or to extract characteristics of the image.

Figure 1:
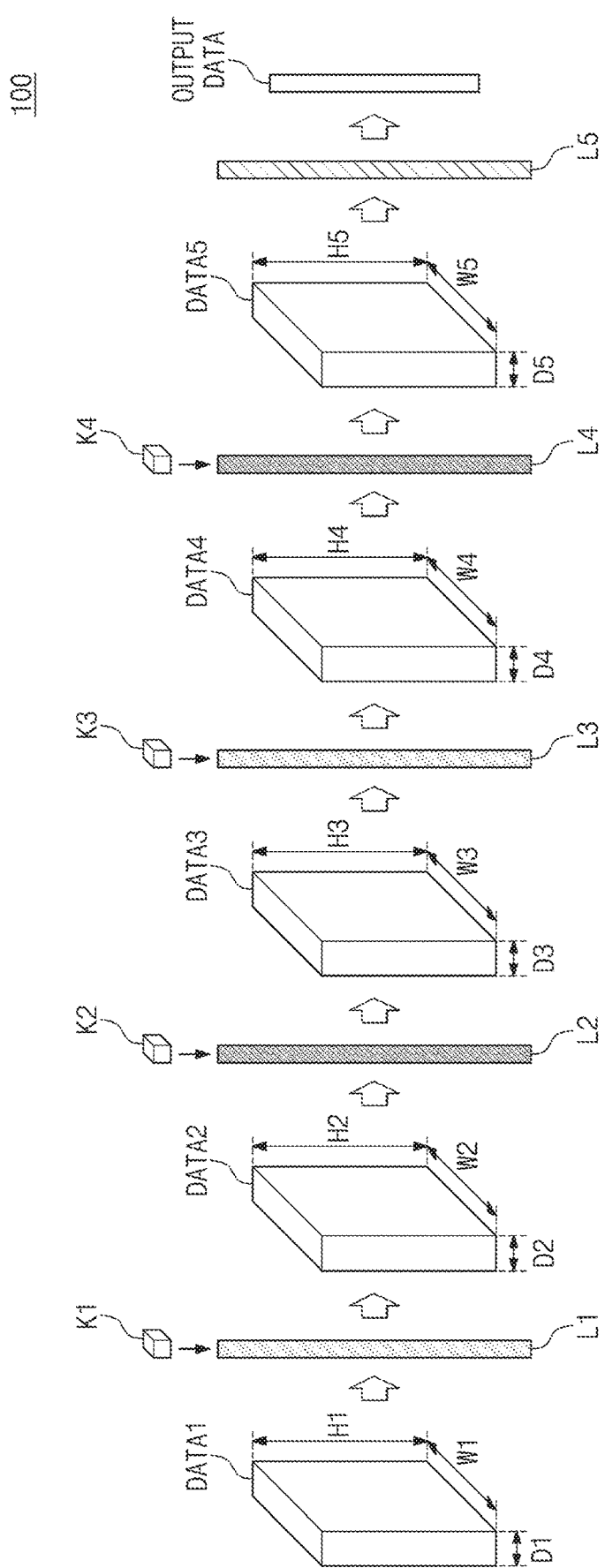
FIG. 1 exemplarily illustrates a Convolutional Neural Network (CCN) according to an embodiment of the inventive concept.

FIG. 1 exemplarily illustrates a CNN according to an embodiment of the inventive concept. In relation to FIG. 1, the CNN 100 may include first to fifth layers L1 to L5.

The CNN may receive first data DATA1 from the outside (e.g., a host or a memory, etc.). The first data DATA1 may represent an input image or input data provided to the CNN 100. For example, the input image may be generated from an image device including a plurality of pixels. The input image may have the size W1×H1×D1. For another example, the first data DATA1 may be an output of another layer.

The first layer L1 may perform a convolution calculation on the first data DATA1 using a first kernel K1, and generate second data DATA2. The first kernel K1 may be a filter, a mask, or a window etc., used for extracting a correlation for values spatially adjacent to each other in the first data DATA1. The first layer L1 may extract a feature of the first data DATA1. The first data DATA1, and the second data DATA2 output from the first layer L1 may be respectively referred to as feature maps.

The first layer L1 performs a multiplication on input values of the first data DATA1 and weight values of a first kernel K1, and performs an addition on the multiplication results, namely performs a convolution calculation. In addition the first layer L1 performs an activation calculation on the addition result. The first layer L1 may perform the activation calculation using a Rectified Linear Unit (ReLU) function, a Leaky ReLU function, a Sigmoid function, a Hyperbolic Tangent (tan h) function, or the like. Furthermore, the first layer L1 may perform a normalization calculation on the activation calculation result. Through the normalization calculation, ranges of the output values of the first layer L1 may match each other, or distributions of the output values of the first layer L1 may be similar to each other.

The second data DATA2 may have the size W2×H2×D2, and the size of the second data DATA2 may be identical or similar to the size of the first data DATA1. For example, when data padding exists in an edge area of the first data DATA1, as shown in FIG. 1, the size of the second data DATA2 may be identical to the size of the first data DATA1.

The second layer L2 may perform a pooling calculation on the second data DATA2 using a second kernel K2. The pooling calculation may be referred to as a sub-sampling calculation. The second layer L2 may select a value of a pixel at a fixed position from among values of the second data DATA2 corresponding to the second kernel K2, calculate the average (namely, average pooling) of the values of the second data DATA2 corresponding to the second kernel K2, or select the maximum value (namely, max pooling) from among the values of the second data DATA2 corresponding to the second kernel K2. Third data DATA3 output from the second layer L2 may be also referred to as a feature map, and the third data DATA3 may have the size W3×H3×D3. For example, the size of the third data DATA3 may be smaller than the size of the second data DATA2.

The third layer L3 may perform a convolution calculation, an activation calculation, a normalization calculation or the like on the third data DATA3 using a third kernel K3. Then, a fourth layer L4 may perform a pooling calculation on fourth data DATA4 using a fourth kernel K4. The third layer L3 may perform a calculation similarly to the first layer L1. For example, the first and third layers L1 and L3 may be convolution layers. The fourth layer L4 may perform a calculation similarly to the second layer L2. For example, the second and fourth layers L2 and L4 may be pooling layers.

In an embodiment, the sizes W2×H2×D2, W3×H3×D3, W4×H4×D4, and W5×H5×D5 of the second to fifth data DATA2 to DATA5 respectively output from the first to fourth layers L1 to L4 may be identical to or different from each other. Although exemplarily illustrated in FIG. 1 as including the four layers L1 to 14, the CNN 100 may actually include more layers.

While the first data DATA1 passes through the first to fourth layers L1 to L4, the size thereof may be reduced. The fifth data DATA5 may include a feature extracted while the first data DATA1 passes through the first to fourth layers L1 to L4. The feature included in the fifth data DATA5 may be a feature representing the first data DATA1. In addition, when the first to fourth kernels K1 to K4 of the first to fourth layers L1 to L4 are set in various ways, various features of the first data DATA1 may be extracted. Referring to FIG. 1, all the sizes of the first to fourth kernels K1 to K4 are illustrated to be identical, but the sizes of the first to fourth kernels may be identical to or different from each other.

The fifth layer L5 may perform a full connection operation on the fifth data DATA5 and generate output data OUTPUT DATA. For example, the fifth layer L5 may be a fully connected layer. The output data OUTPUT DATA may represent a result that the first data DATA1 is recognized or classified. Although exemplarily illustrated as including one fifth layer L5 of FIG. 1, the CNN 100 may actually include further more layers. In the above, the feature maps DATA1 to DATA5 and the kernels K1 to K4 of the first to fourth layers L1 to L4 of the CNN 100 has been briefly described. Hereinafter, a device in which the CNN 100 is implemented in hardware will be described.

Figure 2:
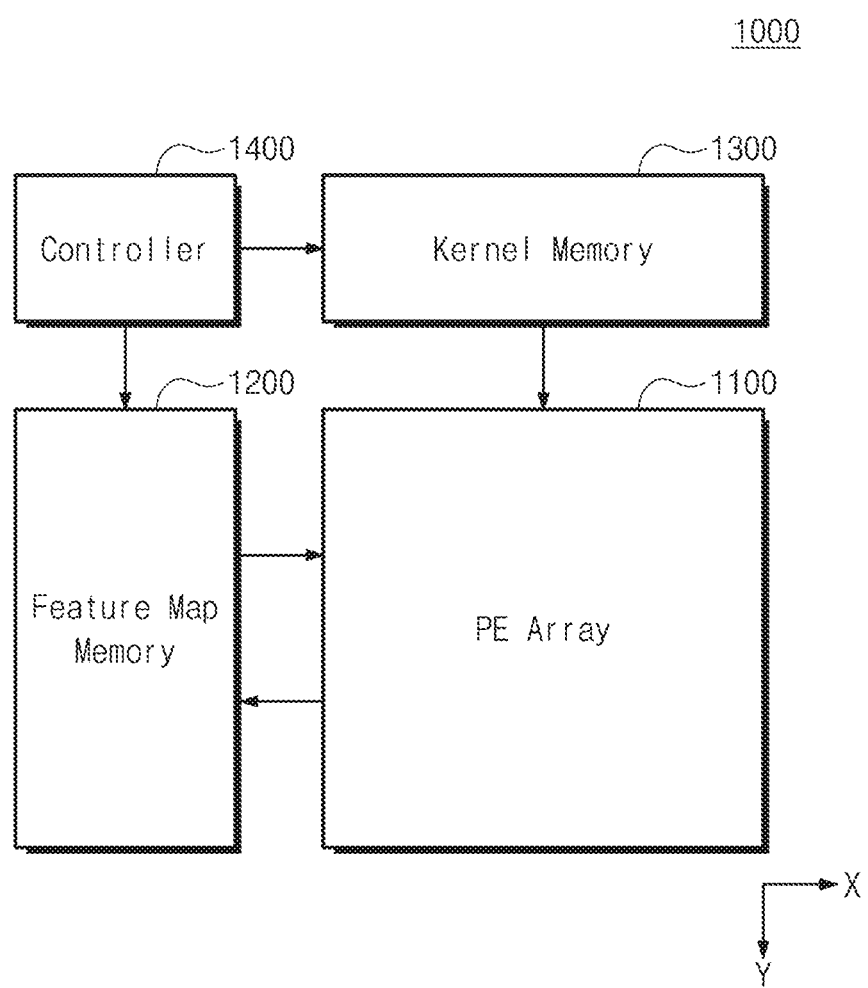
FIG. 2 is a block diagram exemplarily showing a neural network accelerator for performing calculations of the CNN of FIG. 1.

FIG. 2 is a block diagram exemplarily illustrating a neural network accelerator for performing the calculation of the CNN of FIG. 1. A description about FIG. 2 will be provided with reference to FIG. 1. A neural network accelerator 1000 may include a processing element array (hereinafter, PE array) 1100, a feature map memory 1200, a kernel memory 1300, and a controller 1400. The neural network 1000 may be a calculation device implemented in hardware in order to perform a neural network calculation, such as a neural network device, a neural network circuit, a hardware accelerator, or a processing unit. For example, the neural network accelerator 1000 may be implemented using various semiconductor devices such as a System on Chip (SoC), an application specific integrated circuit (ASIC), a Central Processing Unit (CPU), a Graphics Processing Unit (GPU), a Vision Processing Unit (VPU), and a Neural Processing Unit (NPU).

The PE array 1100 may include processing elements (PEs) arranged along an X-axis and a Y-axis. A description about the PEs will be provided with reference to FIG. 3. The PE array 1100 may be a systolic array that performs a calculation according to a synchronization signal (e.g., a clock signal). For example, calculations may include a convolution calculation, an activation calculation, a normalization calculation, or a pooling calculation as described above in relation to FIG. 1.

The PE array 1100 may receive the feature map data transmitted in the X-axis direction from the feature map memory 1200. The X-axis direction may be headed to the PE array 1100 from the feature map memory 1200. The PE array 1100 may receive kernel data transmitted in the Y-axis direction, which is perpendicular to the X-axis, from the kernel memory 1300. The Y-axis direction may be headed to the PE array 1100 from the kernel memory 1300. Here, the feature map data may represent the first to fifth data DATA1 to DATA5 or the feature maps of FIG. 1. The kernel data may be related to the first to fourth kernels K1 to K4 (or filters, windows, or masks).

The PE array 1100 may perform a calculation using the feature map data and the kernel data. The PE array 1100 may transmit the calculation result to the feature map memory 1200 in the opposite direction to the X-axis. Since various calculations of the CNN 100 may be processed in the PE array 1100, the neural network accelerator 1000 may not include an additional block, circuit, or unit, etc., between the feature map memory 1200 and the PE array 1100 for processing various calculations of the CNN 100. The calculation result of the PE array 1100 may be immediately transmitted to the feature map memory 1200. The PE array 1100 receives the feature map data in the X-axis direction and outputs the calculation result in the opposite direction to the X-axis, and thus the PE array 1100 may be bidirectional based on the X-axis.

In an embodiment, the calculation result of the PE array 1100 may be feature map data corresponding to the second to fifth data DATA2 to DATA5 of FIG. 1. Alternatively, the calculation result of the PE array 1100 may be a partial sum that is an intermediate calculation result for generating the feature map data. The PE array 1100 may transmit the partial sum to the feature map memory 1200 so as to generate new feature map data, before transmitting the new feature map data to the feature map memory 1200 due to restriction such as the number or speed of the PEs.

The feature map memory 1200 may store input data or the feature map data corresponding to the first to fifth data DATA1 to DATA5 of FIG. 1. In addition, the feature map memory 1200 may receive and store the calculation result transmitted in the opposite direction to the X-axis from the PE array 1100. The feature map memory 1200 may transmit the feature map data to the PE array 1100 in the X-axis direction, or transmit a previous calculation result of the PE array 1100, which has been previously stored, to the PE array 1100 in the X-axis direction.

The kernel memory 1300 may store kernel data corresponding to the first to fourth kernels K1 to K4 of FIG. 1. The kernel memory 1300 may transmit the kernel data to the PE array 1100 in the Y-axis direction. The kernel data may include weight values of a kernel used for a convolution calculation. The weight values may represent a coupling strength between an arbitrary artificial neuron and another artificial neuron in an arbitrary layer. In an embodiment, the feature map memory 1200 and the kernel memory 1300 may be respectively implemented in different memory devices or in different areas of one memory device.

In an embodiment, positions of the feature map memory 1200 and the kernel memory 1300 with respect to the PE array 1100 are not limited to those illustrated in FIG. 2. For example, the feature map memory 1200 may be located in the right, left or lower side of the PE array 1100, and the kernel memory 1300 may be located in the lower, left, or right side of the PE array 1100. In any case, regardless of the positions of the feature map memory 1200 and the kernel memory 1300, each of the feature map memory 1200 and kernel memory 1300 may transmit data from relatively close PEs to relatively distant PEs in the PE array 1100.

The controller 1400 may generate commands for controlling the PE array 1100, the feature map memory 1200, and the kernel memory 1300. The controller 1400 may generate a (global) clock signal to which the PE array 1100, the feature map memory 1200, the kernel memory 1300 are synchronized. The PE array 1100 and the feature map memory 1200 may exchange the feature map data and the calculation result based on the clock signal. The kernel memory 1300 may transmit the kernel data to the PE array 1100 based on the clock signal.

Figure 3:
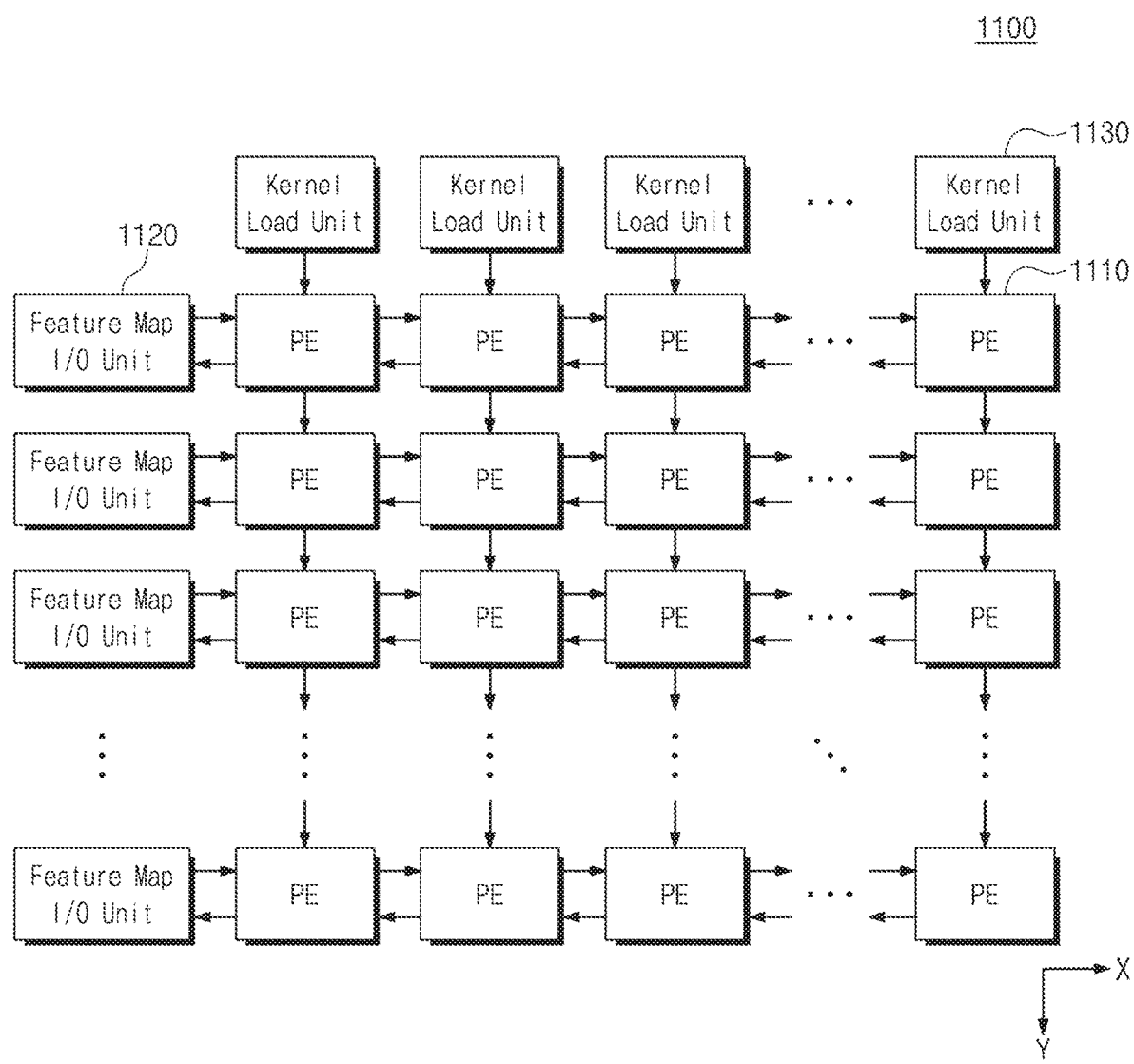
FIG. 3 is a block diagram showing a processing element (PE) array in detail.

FIG. 3 is a block diagram illustrating the PE array of FIG. 2 in more detail. A description about FIG. 3 will be provided with reference to FIGS. 1 and 2. The PE array 1100 may include PEs 1110, feature map input/output (I/O) units 1120, and kernel load units 1130.

The PEs 1110 may be arranged along X-axis and Y-axis directions and may form a two-dimensional array. Each of the PEs 1110 may perform a calculation using the feature map data transmitted in the X-axis direction from the feature map memory 1200 and the kernel data transmitted in the Y-axis direction from the kernel memory 1300. Each of the PEs 1110 may transmit the calculation result to the feature map memory 1200 in the opposite direction to the X-axis.

Each of the PEs 1110 may be synchronized to the clock signal generated by the controller 1400 of FIG. 2. Each of the PEs 1110 may transmit data to adjacent PEs (or next PEs) in the X-axis and Y-axis directions based on the clock signal. In detail, each of the PEs 1110 may transmit the feature map data to the adjacent PE in the X-axis direction based on the clock signal. Each of the PEs 1110 may transmit the calculation result to the adjacent PE in the opposite direction to the X-axis direction based on the clock signal. Each of the PEs 1110 may transmit the kernel data to the adjacent PE along the Y-axis on the basis the clock signal. The PEs 1110 may form a systolic array and may operate at the substantially same time based on the clock signal. The number of PEs 1110 may be determined based on the area, speed, power of the neural network accelerator 1000, or a calculation amount of the CNN 100, etc.

The feature map I/O units 1120 may be arranged along the Y-axis direction. Each of the feature map I/O units 1120 may be arranged along the X-axis direction, and exchange data with PEs 1110 corresponding to one row. For example, each of the feature map I/O units 1120 may receive the feature map data stored in the feature map memory 1200. Each of the feature map I/O units 1120 may transmit the received feature map data to the PEs 1110 in the X-axis direction.

The PEs 1110 arranged along the X-axis direction may perform a calculation on the received feature map data, and then generate a calculation result (new feature map data or a partial sum for generating the new feature map data). Then, each of the feature map I/O units 1120 may receive the calculation result from the PEs 1110 in the opposite direction to the X-axis, and transmit the received calculation result to the feature map memory 1200. Each of the feature map I/O units 1120 may receive the partial sum from the feature map memory 1200, and transmit the received partial sum again to the PEs 1110 in the X-axis direction.

The kernel load units 1130 may be arranged along the X-axis direction. Each of the kernel load units 1130 may receive the kernel data stored in the kernel memory 1300. Each of the kernel load units 1130 may transmit the received kernel data to the PEs 1110 that are arranged along the Y-axis direction and correspond to one column. The direction (the X-axis direction or the opposite direction to the X-axis) in which the feature map data is transmitted, and the direction (the Y-axis direction) in which the kernel data is transmitted may be perpendicular to each other.

Figure 4:
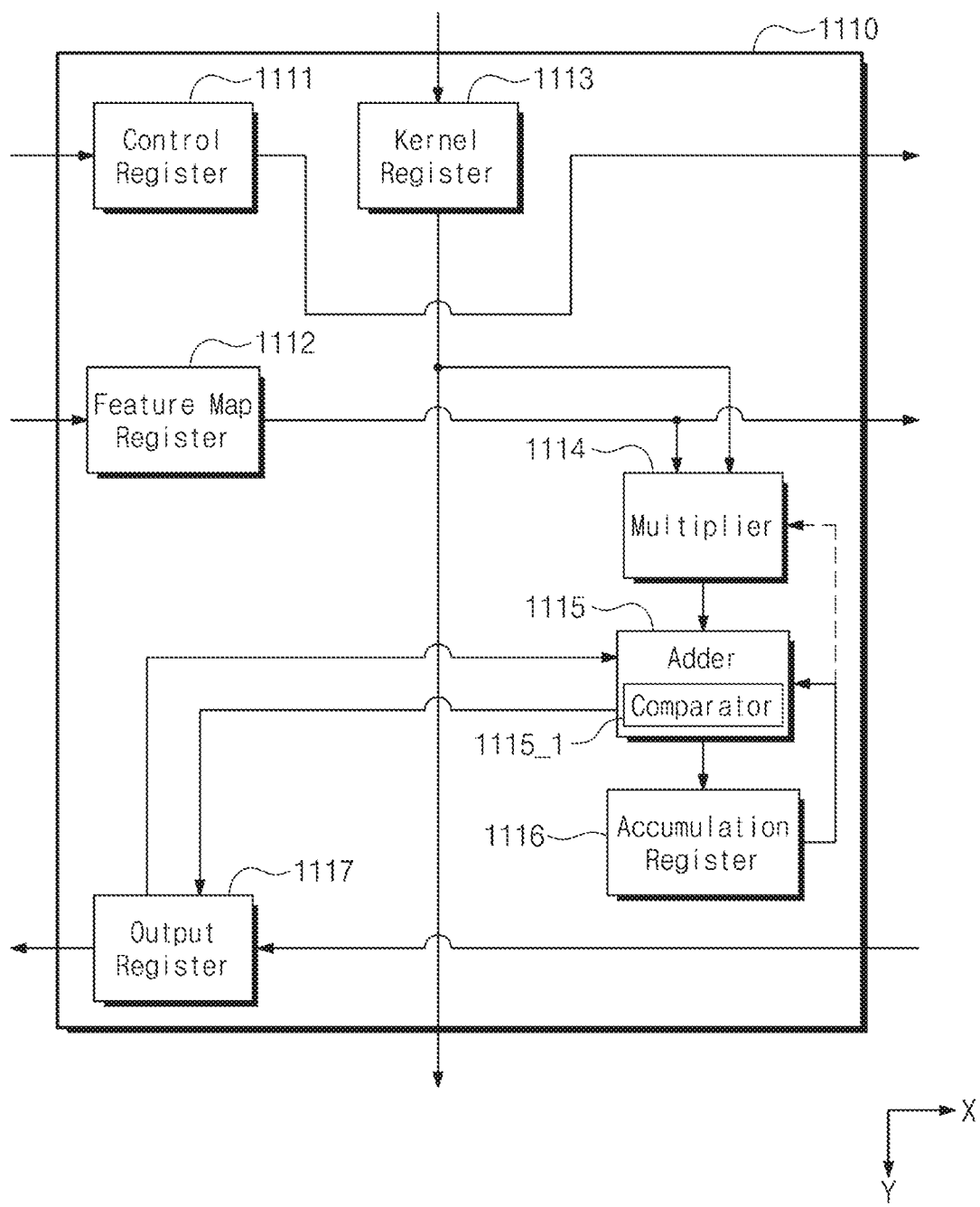
FIG. 4 is a block diagram showing the PE of FIG. 3 in detail.

FIG. 4 is a block diagram showing the PE of FIG. 3 in more detail. A description about FIG. 4 will be provided with reference to FIG. 3. The PE 1110 of FIG. 4 may be an arbitrary one among the PEs in the PE array 1100 of FIG. 3.

In other words, the PEs in the PE array 1100 may be identically implemented. The PE 1110 may include a control register 1111, a feature map register 1112, a kernel register 1113, a multiplier 1114, an adder 1115, an accumulator register 1116, and an output register 1117.

The control register 1111 may store a command transmitted in the X-axis direction. The command may be generated by the controller 1400 of FIG. 2. The control register 1111 may control other elements (the feature map register 1112, the kernel register 1113, the multiplier 1114, the adder 1115, the accumulator register 1116, and the output register 1117) in the PE 110 based on the stored command. The control register 1111 may receive a command in an arbitrary cycle, and then transmit the stored command to another PE (e.g., a right PE) in the X-axis direction in a next cycle. Here, the cycle may represent an arbitrary one cycle of the above-described clock signal. As another example, the control register 1111 may receive a command at a rising edge or a falling edge of the clock signal.

The feature map register 1112 may receive and store the feature map data transmitted in the X-axis direction in an arbitrary cycle. The feature map register 1112 may provide the stored feature map data to the multiplier 1114. The feature map register 1112 may transmit the stored feature map data to another PE (e.g., a right PE) in the X-axis direction in a next cycle.

The kernel register 1113 may receive and store the kernel data transmitted in the Y-axis direction in an arbitrary cycle. The kernel register 1113 may provide the stored kernel data to the multiplier 1114. The kernel register 1113 may transmit the stored kernel data to another PE (e.g., a lower side PE) in the Y-axis direction. The control register 1111, the feature map register 1112 and the kernel register 1113 may be implemented in hardware using at least one flip-flop, at least one latch, at least one logic gate, and the like.

The multiplier 1114 may perform a multiplication on an input value of the received feature map data and a weight value of the received kernel data. For example, a multiplication result of the multiplier 1114 may not be immediately transmitted to another PE, but may be accumulated in the accumulator register 1116. For example, when PE 1110 performs the activation calculation, the normalization calculation, or the pooling calculation of the CNN 100, the calculation result may be transmitted to an adjacent PE (e.g., a left PE) in the opposite direction to the X-axis.

The adder 1115 may perform an addition on the multiplication result of the multiplier 1114 and a previous calculation result accumulated in the accumulator register 1116 in a previous cycle. The accumulator register 1116 may accumulate or store the addition result of the adder 1115. When the accumulator register 1116 receives a new addition result of the adder 1115, the addition result stored therein may be a previous calculation result. In other words, the multiplication result of the multiplier 1114 may be accumulated in the accumulator register 1116.

In an embodiment, the PE 1110 may perform a multiply-accumulate (MAC) calculation using the multiplier 1114, the adder 1115, and the accumulator register 1116. The multiplier 1114, the adder 1115, and the accumulator register 1116 may be implemented in hardware using at least one flip-flop, at least one latch, at least one logic gate, and the like. The PE 1110 may repeatedly perform the multiply-accumulate calculation to perform the convolution calculation, the activation calculation, and the normalization calculation described above in relation to FIG. 1.

The convolution calculation is a calculation for multiplying the feature map data by the kernel data, and adding all the multiplication results. The activation calculation and normalization calculation may include calculations for multiplying or adding a convolution calculation result stored in the accumulator register 1116 by or to a specific value. In other words, the convolution calculation result stored in the accumulator register 1116 may be provided to the multiplier 1114 (see a dotted line arrow) and the adder 1115 (see a solid line arrow). For example, the PE 1110 including the multiplier 1114, the adder 1115, and the accumulator register 116 may perform the activation calculation using a ReLU function and a Leaky ReLU function.

The output register 1117 may store the addition result of the adder 1115. The addition result stored in the output register 1117 is a calculation result transmitted from the PE 1110 in the opposite direction to the X-axis. The output register 1117 may store the calculation result transmitted from another PE (e.g., a right PE) in the opposite direction to the X-axis.

In an embodiment, the PE 1110 may further perform a pooling calculation of the CNN 100 using the multiplier 1114, the adder 1115, the accumulator register 1116, and the output register 1117. The PE 1110 may compare a new calculation result, which is obtained by performing the convolution calculation, the activation calculation, and the normalization calculation, with a previous calculation result stored in the output register 1117. Here, the new calculation result may be generated by the adder 1115. The adder 1115 may further include a comparator 1115_1 configured to perform a comparison calculation on the new calculation result and the previous calculation result.

For the max pooling calculation, based on the comparison result from the comparator 1115_1, the output register 1117 may store a larger one between the new calculation result and the previous calculation result. For example, the output register 1117 may be updated with the new calculation result larger than the previous one, or may be maintained with the previous one larger than the new one.

For the average pooling, the adder 1115 may perform an addition and division calculation (e.g., a shift calculation) on the previous and new calculation results. For example, the output register 1117 may be updated with the division calculation result.

The PE 1110 according to an embodiment of the present invention may internally perform or process all of the convolution calculation, the activation calculation, the normalization calculation, and the pooling calculation of the CNN 100. Through this, the number of times of data exchange between the PE array 1100, the feature map memory 1200, and the kernel memory 1300 may be minimized Since the frequency of accesses to the feature map 1200 and the kernel memory 1300 are low, the areas of the feature map memory 1200 and the kernel memory 1300, and power consumption of the neural network accelerator 1000 may be improved.

Figure 5:
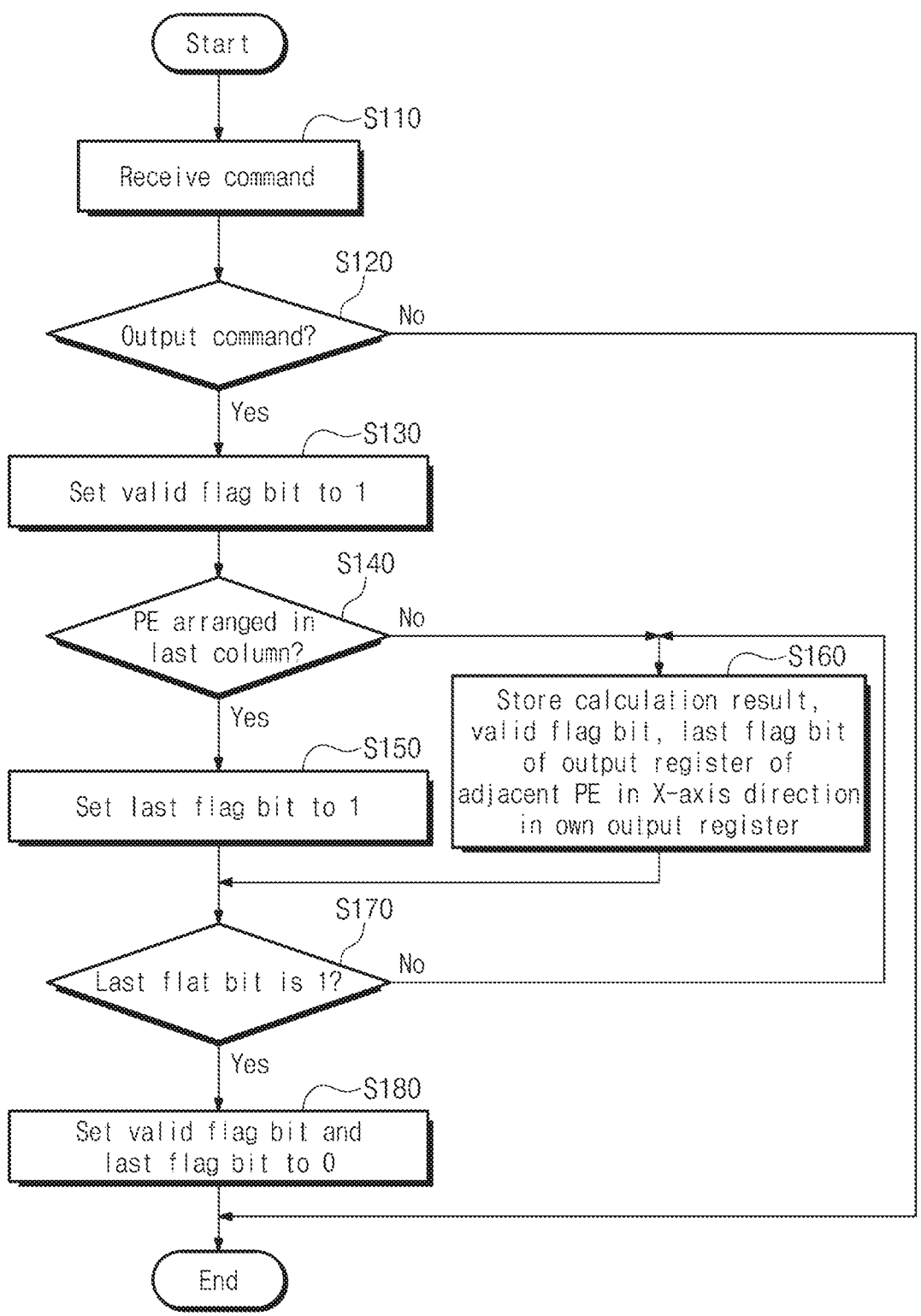
FIG. 5 is a flowchart exemplarily illustrating a method for receiving, by the PE of FIG. 4, a calculation result in an X-axis direction in response to an output command.

FIG. 5 is a flowchart exemplarily illustrating a method for receiving, by the PE of FIG. 4, a calculation result in an X-axis direction in response to an output command A description about FIG. 5 will be provided with reference to FIGS. 1 to 4.

In operation S110, the PE 1110 of FIG. 4 may receive a command transmitted in the X-axis direction. In operation S120, the PE 1110 may determine whether the received command is an output command. When the PE 1110 receives the output command, operation S130 may proceed. When not receiving the output command, the PE 1110 may process a calculation corresponding to a command other than the output command.

In operation S130, the PE 1110 may activate a valid flag bit. For example, the PE 1110 may set the valid flag bit to 1. Here, the logic value of the activated valid flag bit is not limited thereto. The output register 1117 may further store the value of the valid flag bit in addition to a calculation result of the PE 1110. The valid flag bit stored in the output register 1117 may be transmitted to another PE in the opposite direction to the X-axis together with the calculation result of the PE 1110. The valid flag bit of the PE 1110 may be used to determine whether an adjacent PE, which is located beside the PE 1110 along the opposite direction to the X-axis, stores the calculation result of the PE 1110 in an own output register. The valid flag bit of the PE 1110 may represent whether the calculation result of the PE 1110 is valid.

In operation S140, the PE 1110 may determine whether an own position is the last column Here, the last column may represent a column that is the most distant in the X-axis direction from a column in which the feature map I/O units 1120 of FIG. 3 are arranged, from among columns in which the PEs 1110 of FIG. 3 are arranged. Unlike the shown in FIG. 3, the feature map I/O units 1120 may be arranged in an arbitrary row parallel to the X-axis. In this case, in operation S140, the PE 1110 may determine whether the own position is in the last row.

For example, the PE 1110 may determine the own position based on address information provided by the controller 1400 of FIG. 2. Alternatively, the address information may be programmed in advance to the PEs arranged in the last column. The PE 1110 arranged in the last column may perform operation S150. The PE 1110, which is not arranged in the last column, may perform operation S160.

In operation S150, the PE 1110 may activate a last flag bit. For example, the PE 1110 may set the last flag bit to 1. Here, the logic value of the activated last flag bit is not limited to the above-described example. The output register 1117 may further store the last flag bit in addition to the calculation result and the valid flag bit of the PE 1110. The last flag bit stored in the output register 1117 may be transmitted to another PE in the opposite direction of the X-axis together with the calculation result and the valid flag bit of the PE 1110. The last flag bit may represent whether the PE 1110 is arranged in the most distant column from the feature map memory 1200 in the X-axis direction.

In operation S160, the PE 1110 may store, in an own output register, a calculation result, a valid flag bit, and a last flag bit stored in an output register of an adjacent PE next to the PE 1110 along the X-axis direction. The PE 1110 may receive a calculation result, a valid flag bit, and a last flag bit transmitted from the adjacent PE in the opposite direction to the X-axis.

In operation S170, the PE 1110 may determine whether the received last flag bit has been activated. For example, the PE 1110 may determine whether the logic value of the received last flag bit is 1. When the last flag bit has not been activated, the PE 1110 may perform again operation S160. When the last flag bit has been activated, the PE 1110 may perform operation S180. In other words, the PE 1110 may repeatedly receive and store the calculation result, the valid flag bit, and the last flag bit that are stored in the output register of the adjacent PE and transmitted in the opposite direction to the X-axis, until receiving the activated last flag bit from the adjacent PE.

In operation S180, the PE 1110 may deactivate all of the own valid flag bit and the last flag bit based on the activated last flag bit. For example, the PE 1110 may set all of the own valid flag bit and the last flag bit to 0. The PE 1110 performing operation S180 may not receive the calculation result any more from the adjacent PE. The PE 1110 may deactivate the own valid flag bit and the last flag bit so as to receive another output command In other words, the PE 1110 may reset the own valid flag bit and the last flag bit.

Figure 6:
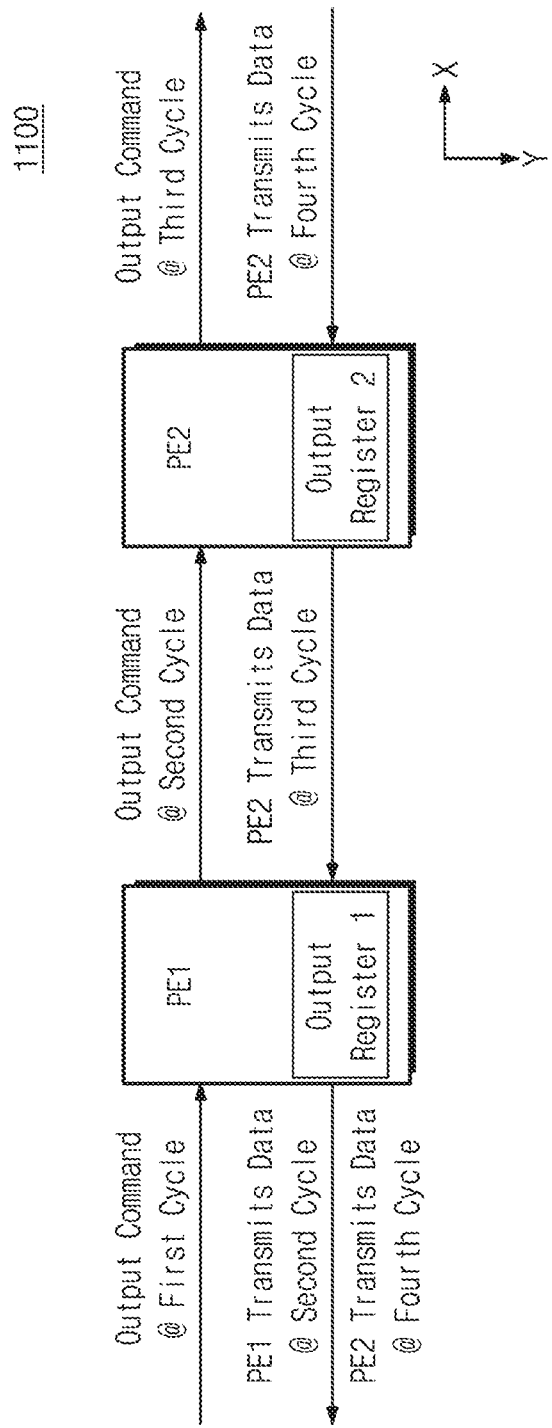
FIG. 6 exemplarily illustrates a first PE and a second PE receiving the output command in the X-axis direction.

FIG. 6 exemplarily illustrates a first PE and a second PE receiving the output command in the X-axis direction. A description about FIG. 6 will be provided with reference to FIGS. 1 to 5. The first PE and the second PE may be arranged along the X-axis. The first PE may be located beside the second PE along the opposite direction to the X-axis, and reversely, the second PE may be located beside the first PE in the X-axis direction. The first and second PEs may be adjacent to each other. Each of the first and second PEs may be implemented identically to the PE 1110 of FIG. 4.

The first PE may include a first output register that is the output register 1117. In addition, the second PE may include a second output register that is the output register 1117. The first output register may store a first valid flag bit and a first last flat bit. The second output register may store a second valid flag bit and a second flag bit.

In a first cycle, the first PE may receive an output command. The first PE may activate the first valid flat bit based on the output command (see operation S130).

In a second cycle, an adjacent PE or the feature map I/O unit 1120 located beside the first PE along the opposite direction to the X-axis may receive and store first PE data including a first calculation result, the first valid flag bit, and the first last flag bit based on the first valid flag bit and the first last flag bit (see operation S160). The first PE may transmit the output command to the second PE and the second PE may receive the output command. The second PE may activate the second valid flag bit or the second last flag bit based on the output command (see operations S130 and S150).

In a third cycle, the first PE may receive and store second PE data including a second calculation result, the second valid flag bit, and the second last flag bit based on the second valid flag bit and the second last flag bit (see operation S160). The second PE may transmit the output command to an adjacent PE (e.g., a third PE) located beside the second PE along the X-axis direction.

In an embodiment, the first PE does not activate the first valid flag bit substantially only in the first cycle. For example, the first PE may active the first valid flag in the second cycle or between the first cycle and the second cycle. Similarly, the second PE does not activate the second valid flag bit or the second last flag bit substantially only in the second cycle. For example, the second PE may activate the second valid flag bit or the second last flag bit in the third cycle or between the second cycle and the third cycle.

In a fourth cycle, the second PE may receive and store third PE data of an adjacent PE located beside the second PE along the X-axis direction (see operation S160). Another PE or the feature map I/O unit 1120 located beside the first PE may receive and store the second PE data transmitted to the first PE (see operation S160).

In relation to FIG. 6, the PE data is not output for each cycle from the first PE. The first PE data and the second PE data may be respectively output in the second cycle and the fourth cycle from the first PE. In briefly, the calculation result of the PE array 1100 may be transmitted to the feature map memory 1200 during cycles as twice as the number of columns with the PEs 1110 arranged therein.

Figure 7:
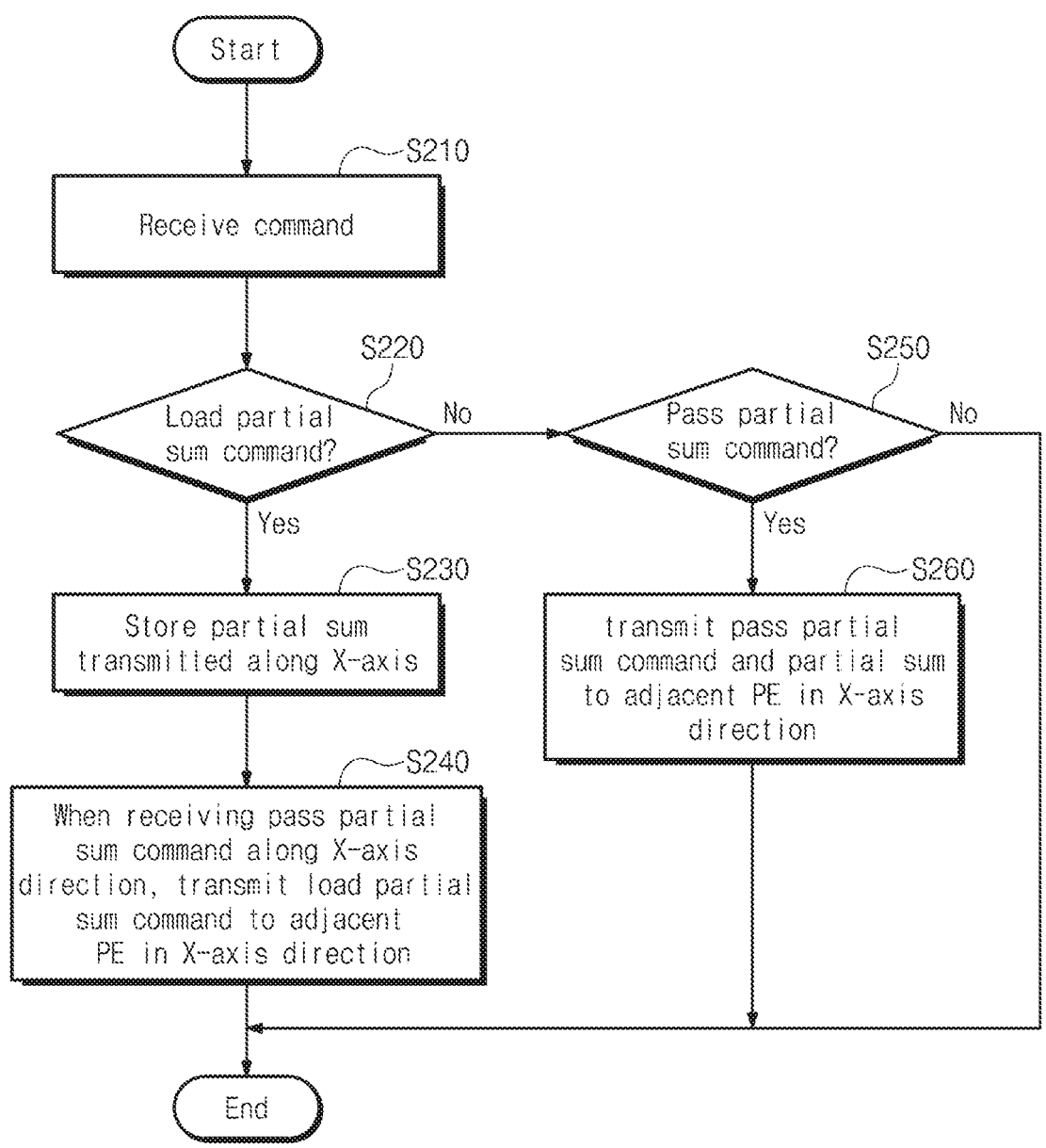
FIG. 7 is a flowchart exemplarily illustrating a method for transmitting, by the PE of FIG. 4, a partial sum in an opposite direction to the X-axis in response to a load partial sum command or a pass partial sum command.

FIG. 7 is a flowchart exemplarily illustrating a method for transmitting, by the PE of FIG. 4, a partial sum in an opposite direction to the X-axis in response to a load partial sum command or a pass partial sum command A description about FIG. 7 will be provided with reference to FIGS. 1 to 4. A direction to which the PE 1110 transmits the partial sum in response to the load partial sum command or the pass partial sum command, and a direction to which the PE 1110 transmit the calculation result in response to the output command are opposite to each other.

In operation S210, the PE 1110 of FIG. 4 may receive a command transmitted in the X-axis direction. In operation S220, the PE 1110 may determine whether the received command is the load partial sum command. When the PE 1110 receives the load partial sum command, operation S230 may proceed. When the PE 1110 does not receive the load partial sum command, operation S250 may proceed.

In operation S230, the PE 1110 may store the partial sum transmitted together with the load partial sum command in the X-axis direction in response to the load partial sum command Here, the accumulator register 1116, not the feature map register 1112 of the PE 1110, may store the received partial sum. The feature map register 1112 may store the feature map data, and the accumulator register 1116 may store the partial sum that is an intermediate calculation result for generating new feature map data.

In operation S240, the PE 1110 may receive the pass partial sum command transmitted in the X-axis direction in a next cycle after receiving the command in operation S210. The PE 1110 may temporarily store the partial sum transmitted together with the pass partial sum command in response to the pass partial sum command. The partial sum transmitted together with the pass partial sum command may be for any one of other PEs located along the X-axis direction. The control register 1111 of the PE 1110 may transmit, instead of the pass partial sum command, the load partial sum command and a temporally stored partial sum to the adjacent PE in the X-axis direction in a next cycle after receiving the pass partial sum command.

In operation S250, the PE 1110 may determine whether the command having been received in operation S210 is the pass partial sum command. When the PE 1110 receives the pass partial sum command, operation S260 may proceed. Here, a time (namely, a cycle) when the pass partial sum command is transmitted to the PE 1110 in operation S250, and a time when the pass partial sum command is transmitted to the PE 1110 in operation S240 are different. For example, in operation S240, the PE 1110 may receive the pass partial sum command in a next cycle, after receiving the load partial sum command. The PE 1110 may further receive the pass partial sum command in a next cycle (namely, in operation S250) after having received the pass partial sum command in operation S240. When the PE 1110 does not receive the pass partial sum command, the PE 1110 may process a calculation corresponding to a command other than the pass partial sum command.

In operation S260, the PE 1110 may transmit the pass partial sum command and the partial sum to an adjacent PE in the X-axis direction. As described above, the partial sum transmitted together with the pass partial sum command is not for the PE 1110, but for any one of other PEs located along the X-axis direction. In operation S240, the control register 1111 may transmit the load partial sum command and the partial sum to the adjacent PE, but in operation S260, the control register 1111 may transmit the pass partial sum command and the partial sum to the adjacent PE.

Figure 8:
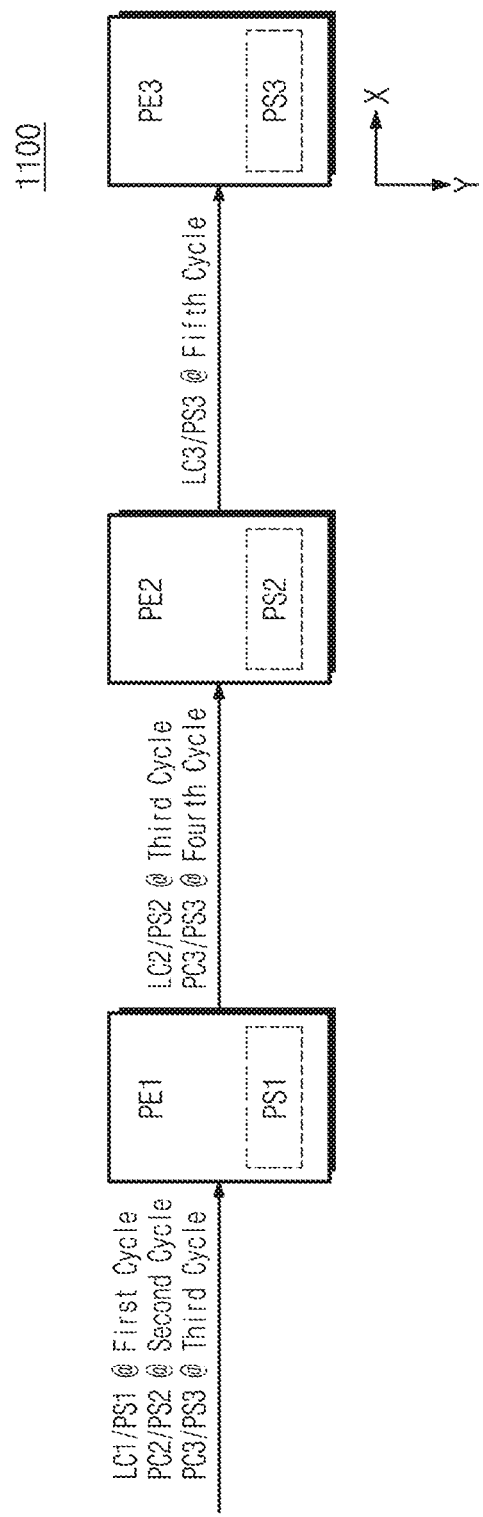
FIG. 8 exemplarily illustrates first to third PEs receiving the load partial sum command and pass partial sum command in the X-axis direction.

FIG. 8 exemplarily illustrates first to third PEs receiving the load partial sum command and the pass partial sum command in the X-axis direction. A description about FIG. 8 will be provided with reference to FIGS. 1 to 4, and FIG. 7. In FIG. 8, the first to third PEs may be arranged along the X-axis. Along the opposite direction of the X-axis, the first PE may be located beside the second PE, and the second PE may be located beside the third PE. Along the X-axis, the second PE may be located beside the first PE, and the third PE may be located beside the second PE. The first and second PEs may be adjacent to each other, and the second and third PEs may be adjacent to each other. Each of the first to third PEs may be implemented identically to the PE 1110 of FIG. 4.

In the first cycle, the first PE may receive a first load partial sum command LC1 and a first partial sum PS1 transmitted in the X-axis direction. The first PE may store the first partial sum PS1 to an own accumulator register 1116 (see operation S230).

In the second cycle, the first PE may receive a second pass partial sum command PC2 and a second partial sum PS2 transmitted in the X-axis direction. The second partial sum PS2 may be for the second PE, not for the first PE. The first PE may temporarily store the second partial sum PS2 so that the second partial sum PS2 is transmitted to the second PE.

In the third cycle, the first PE may transmit a second load partial sum command LC2 and the second partial sum PS2 to the second PE in the X-axis direction instead of the second pass partial sum command PC2 having been received in the second cycle (see operation S240). The second PE may store the received second partial sum PS2 (see operation S230). In addition, the first PE may receive a third pass partial sum command PC3 and a third partial sum PS3 in the X-axis direction. The third partial sum PS3 may be for the third PE, not for the first and second PEs. The first PE may temporarily store the first partial sum PS3 so that the third partial sum PS3 is transmitted to the third PE (see operation S260).

In a fourth cycle, the second PE may receive the third pass partial sum command PC3 and the third partial sum PS3 transmitted from the first PE in the X-axis direction. Similarly, the second PE may temporarily store the third partial sum PS3 so that the third partial sum PS3 is transmitted to the third PE.

In a fifth cycle, the second PE may transmit the third load partial sum command LC3 and the third partial sum PS3 to the third PE in the X-axis direction instead of the third pass partial sum command PC3 having been received in the fourth cycle (see operation S240). The third PE may store the received third partial sum PS3 (see operation S230).

In relation to FIG. 8, the load partial sum commands are not transmitted to the first to third PEs for each cycle. The first PE may receive the first load partial sum command LC1 in the first cycle, the second PE may receive the second load partial sum command LC2 in the third cycle, and the third PE may receive the third load partial sum command LC3 in the fifth cycle. In briefly, the partial sum stored in the feature map memory 1200 may be transmitted to the PE array 1100 during cycles as many as twice the number of columns in which the PEs 1110 are arranged.

Figure 9:
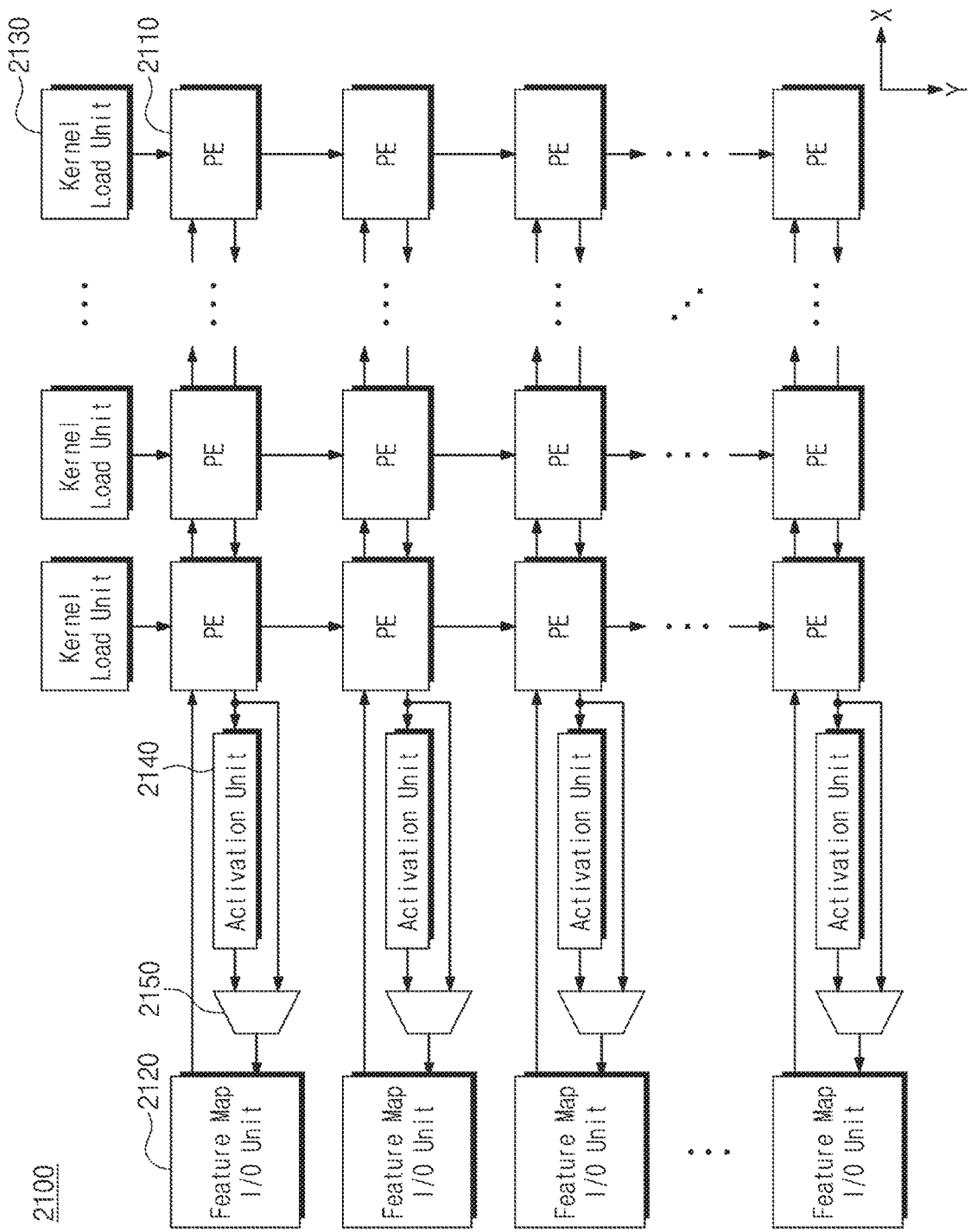
FIG. 9 is a block diagram exemplarily showing the PE array of FIG. 2 according to another embodiment of the inventive concept.

FIG. 9 is a block diagram exemplarily showing the PE array of FIG. 2 according to another embodiment of the inventive concept. A description about FIG. 9 will be provided with reference to FIG. 8. A PE array 2100 may include PEs 2110, feature map I/O units 2120, kernel load units 2130, activation units 2140, and multiplexing units 2150. The PEs 2110, the feature map I/O units 2120, and the kernel load units 2130 may be implemented substantially identically to the PEs 1110, the feature map I/O units 1120, the kernel load units 1130 of FIG. 3.

The activation units 2140 may be arranged along a Y-axis between the feature map I/O units 2120 and the PEs 2110. The activation units 2140 may receive calculation results from the PEs 2110 based on the operations according to the flowchart of FIG. 5. Each of the activation units 2140 may perform an activation calculation using a Sigmoid function or a Hyperbolic Tangent (tan h) function as well as the ReLU function or the Leaky ReLU function used by each PE 2110. The activation units 2140 may transmit results of the activation calculations to the multiplexing units 2150.

The multiplexing units 2150 may be arranged along the Y-axis between the activation units 2140 and the feature map I/O units 2120. The multiplexing units 2150 may select either the calculation results from the PEs 2110 or the calculation results of the activation units 2140 based on controls of the controller 1400 of FIG. 2 in accordance with the calculations performed by the CNN 100. The selected calculation result may be transmitted to the feature map I/O units 2120.

According to embodiments of the inventive concept, the neural network accelerator may perform the convolution calculations, the activation calculations, the normalization calculations, and the pooling calculations in the bidirectional PE array to output calculation results to a memory at a time. In addition, the neural network accelerator may receive the partial sum, which is the intermediate calculation result, from the bidirectional PE array, or transmit the partial sum to the bidirectional PE array. Accordingly, the neural network accelerator may minimize accesses to the memory to efficiently perform the neural network calculations.

The above-described is detailed embodiments for practicing the present inventive concept. The present disclosure includes not only the above-described embodiments but also simply changed or easily modified embodiments. In addition, the present inventive concept also include techniques easily modified and practiced using the embodiments of the present disclosure. Therefore, the scope of the present disclosure is not limited to the described embodiments but is defined by the claims and their equivalents.

What is claimed is:

1. A neural network accelerator which performs a calculation of a neural network comprising layers, the neural network accelerator comprising:
   a kernel memory configured to store kernel data related to a filter;
   a feature map memory configured to store feature map data which are outputs of the layers; and
   a processing element (PE) array comprising PEs arranged along first and second directions,
   wherein each of the PEs is configured to perform a calculation using the feature map data transmitted in the first direction from the feature map memory and the kernel data transmitted in the second direction from the kernel memory, and transmit a calculation result to the feature map memory in a third direction opposite to the first direction,
   wherein the calculation comprises a multiplication, an addition, an activation calculation, a normalization calculation, and a pooling calculation,
   wherein the PE array further comprises:
   kernel load units configured to transmit the kernel data to the PEs in the second direction; and
   feature map input/output (I/O) units configured to transmit the feature map data to the PEs in the first direction, receive the calculation result transmitted in the third direction, and transmit the calculation result to the feature map memory,
   wherein each of the PEs comprises:
   a control register configured to store a command transmitted in the first direction;
   a kernel register configured to store the kernel data;
   a feature map register configured to store the feature map data;
   a multiplier configured to perform a multiplication on data stored in the kernel register and the feature map register;
   an adder configured to perform an addition on a multiplication result of the multiplier and a previous calculation result;
   an accumulator register configured to accumulate the previous calculation result or an addition result of the adder; and
   an output register configured to store a calculation result transmitted in the third direction from another PE or the addition result,
   wherein the feature map I/O unit is further configured to receive, from the PEs, new feature map data or a partial sum for generating the new feature map data based on an output command, and transmit the new feature map data or the partial sum for generating the new feature map data to the feature map memory, and
   wherein the output register further is further configured to store a valid flag bit indicating whether the calculation result is valid based on the output command transmitted to the control register, and a last flag register bit indicating whether the PE is arranged in a most distant column from the feature map memory based on the first direction.

2. The neural network accelerator of claim 1, wherein the PEs comprise a first PE and a second PE located beside the first PE,
   wherein the first PE is configured to receive the calculation result, the valid flag bit, and a last flag bit of the second PE in the third direction based on the valid flag bit and the last flag bit of the second PE.

3. The neural network accelerator of claim 2, wherein the first PE is further configured to repeatedly receive the calculation result, the valid flag bit and the last flag bit of the second PE in the third direction until the last flag bit of the second PE is activated.

4. A neural network accelerator which performs a calculation of a neural network comprising layers, the neural network accelerator comprising:
   a kernel memory configured to store kernel data related to a filter;
   a feature map memory configured to store feature map data which are outputs of the layers; and
   a processing element (PE) array comprising PEs arranged along first and second directions,
   wherein each of the PEs is configured to perform a calculation using the feature map data transmitted in the first direction from the feature map memory and the kernel data transmitted in the second direction from the kernel memory, and transmit a calculation result to the feature map memory in a third direction opposite to the first direction,
   wherein the calculation comprises a multiplication, an addition, an activation calculation, a normalization calculation, and a pooling calculation,
   wherein the PE array further comprises:
   kernel load units configured to transmit the kernel data to the PEs in the second direction; and
   feature map input/output (I/O) units configured to transmit the feature map data to the PEs in the first direction, receive the calculation result transmitted in the third direction, and transmit the calculation result to the feature map memory, wherein each of the PEs comprises:

a control register configured to store a command transmitted in the first direction;

a kernel register configured to store the kernel data;

a feature map register configured to store the feature map data;

a multiplier configured to perform a multiplication on data stored in the kernel register and the feature map register;

an adder configured to perform an addition on a multiplication result of the multiplier and a previous calculation result;

an accumulator register configured to accumulate the previous calculation result or an addition result of the adder; and an output register configured to store a calculation result transmitted in the third direction from another PE or the addition result, wherein the feature map I/O unit is further configured to receive, from the PEs, new feature map data or a partial sum for generating the new feature map data based on an output command, and transmit the new feature map data or the partial sum for generating the new feature map data to the feature map memory, and wherein the feature map I/O unit is further configured to receive the partial sum from the feature map memory in the first direction and transmit the partial sum to the PEs, based on a load partial sum command and a pass partial sum command.

5. The neural network accelerator of claim 4, wherein the accumulator register of each the PEs is further configured to store the partial sum transmitted in the first direction in response to the load partial sum command transmitted to the control register.

6. The neural network accelerator of claim 5, wherein the PEs comprise a first PE and a second PE located beside the first PE in the first direction, wherein the first PE is configured to transmit the load partial sum command to the second PE instead of the pass partial sum command when receiving the pass partial sum command after receiving the load partial sum command.

7. The neural network accelerator of claim 6, wherein the first PE is further configured to transmit, to the second PE, a partial sum transmitted together with the received pass partial sum command in the first direction.

* * * * *